United States Patent Office 2,742,890
Patented Apr. 24, 1956

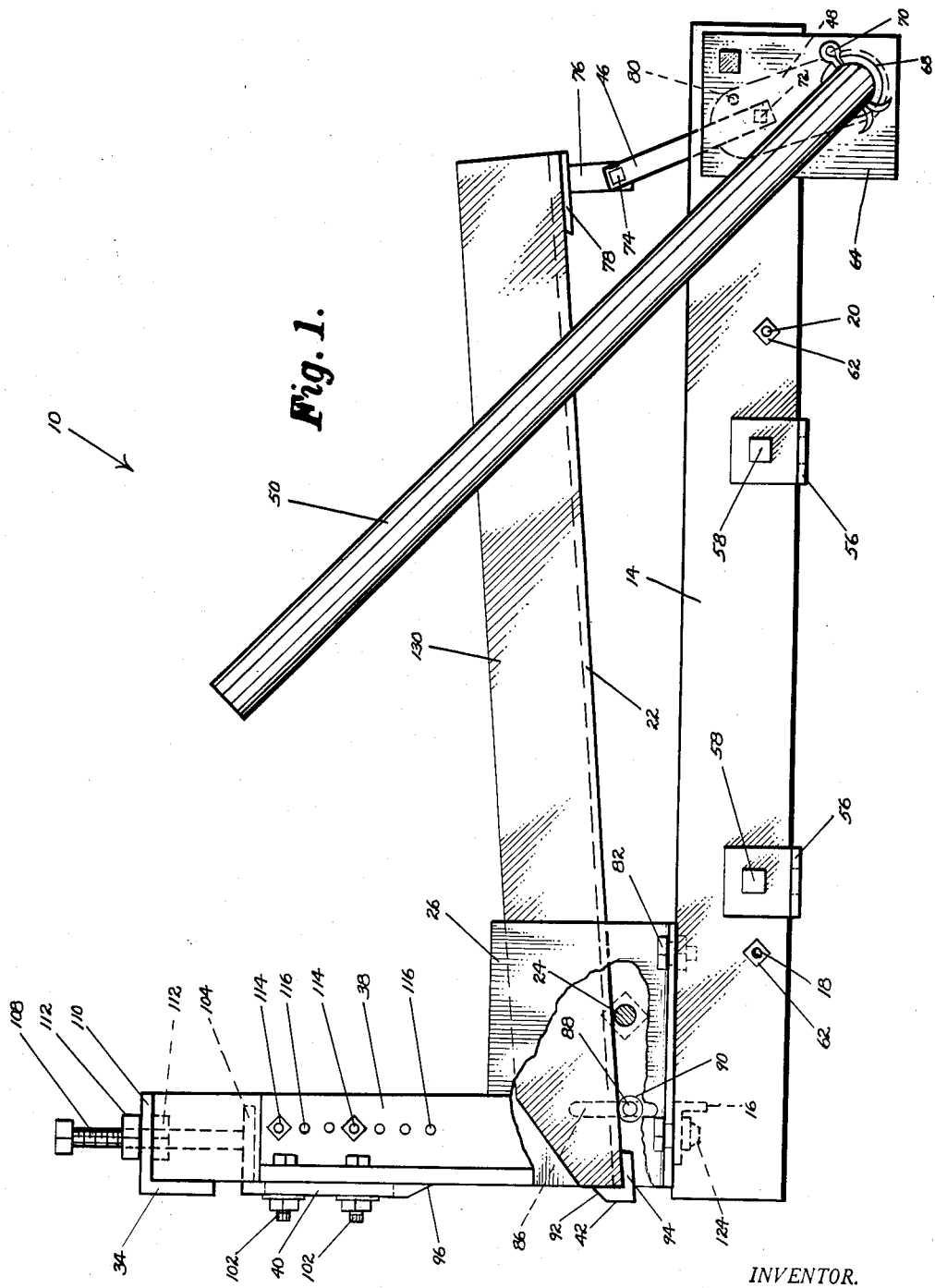

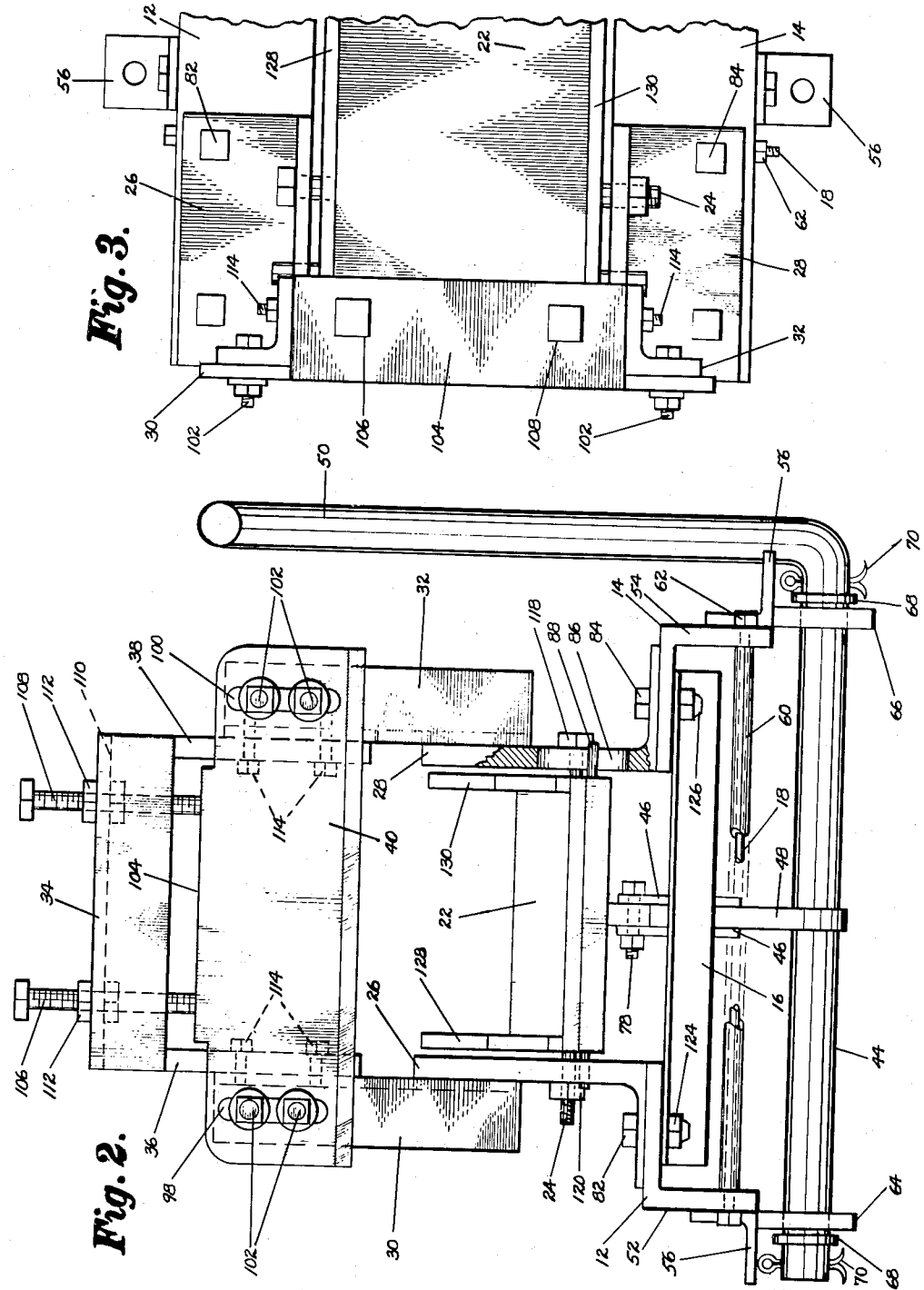

2,742,890

LEVER ACTION STONE SPLITTER

Herman H. Gladow, Manhatten, Kans.

Application September 21, 1954, Serial No. 457,484

3 Claims. (Cl. 125—23)

This invention relates to tools used in masonry and particularly stone cutting machines and equipment, and in particular a base frame adapted to be mounted on a table and a lever actuated pivotally mounted cradle having a stone cutting blade extended across one end, and a coacting blade adjustably mounted on a U-shaped frame extended above the former blade wherein with a stone positioned on the cradle the cradle is adapted to be actuated by the lever whereby both blades engage the stone instantaneously cutting a square surface on the end of the stone.

The purpose of this invention is to provide a stone cutter in which the weight of the stone and mounting elements thereof are utilized to accentuate the cutting action instead of relying entirely upon the strength or power of an operator.

With conventional stone cutting machines and devices the blocks of stone are placed in cradles or on base frames or the like and the blades are brought downwardly by levers to strike and cut the stones. By this means the force is applied by the operator and in numerous instances considerable power is required to cut or break the stones with even or square surfaces. With this thought in mind this invention contemplates a base frame including spaced parallel side bars with a lever pivotally mounted in one end and with a U-shaped frame extended upwardly from the opposite end whereby with one cutting blade on the U-shaped frame and another on an end of a cradle pivotally mounted on the base frame the cradle is adapted to be actuated by the hand lever to bring both cutting blades against the end of a stone positioned on the cradle at the same instant.

The object of this invention is, therefore, to provide a stone cutter in which a stone carrying tray is supported whereby the weight of the stone actuates the tray or cradle to increase the force of a blow resulting from lever operated cutting knives.

Another object of the invention is to provide a stone cutter in which coacting cutting knives cut and face off the ends of rough building stones so that the corners are square with the side surfaces of the stones.

Another important object of the invention is to provide a stone cutter having opposed cutting blades that cut from both upper and lower surfaces of the stones in which the stones are adapted to be cut by being positioned on a cradle, or held by hand with the body of the stone extended from the front of the machine and with the end to be cut held between the cutting blades.

A further object of the invention is to provide a stone cutting machine in which stones are cut by two opposed blades in which one blade remains stationary and a movable blade on the end of a pivotally mounted cradle drives a stone on the cradle against the stationary blade.

A still further object of the invention is to provide a stone cutter having opposed cutting blades which cut simultaneously from opposite sides of a stone end in which the weight of the stone assists the cutting action in which the machine is of a simple and economical construction.

With these and other objects and advantages in view the invention embodies a horizontally disposed base frame, a rock carrying cradle positioned above the base frame with one end resting upon a transversely disposed bolt mounted in L-shaped supports and with the other connected by links and an arm to a crank actuated shaft, a rock cutting blade on the end of the cradle resting upon the bolt, and a stationary rock cutting blade adjustably mounted on a frame extended upwardly from the base frame.

Other features and advantages of the invention will appear from the following description taken in connection with the drawings, wherein:

Figure 1 is a side elevational view of the lever action stone splitter with part broken away to show the cradle carrying bolt.

Figure 2 is a front elevational view of the improved stone cutter looking toward the stone cutting blades.

Figure 3 is a plan view of the end of the stone cutter on which the cutting blades are positioned, the opposite end of the device being broken away.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numerals 12 and 14 indicating angle bars providing parallel side bars of a base frame, numeral 16 an angle bar connecting the side bars at the forward end of the frame, numerals 18 and 20 stay bolts connecting intermediate parts of the side bars, numeral 22 a base plate of a stone carrying cradle, numeral 24 a bolt mounted in L-shaped supports 26 and 28 and upon which one end of the base plate of the cradle rests, numerals 30 and 32 vertically disposed angle posts welded to and extended upwardly from the supports, numeral 34 an angle bar adjustably held by arms 36 and 38 on the upper ends of the posts, numeral 40 an upper stone cutting blade adjustably mounted on the posts, numeral 42 a lower stone cutting blade mounted on the forward end of the cradle, numeral 44 a shaft rotatably mounted in the base frame and connected by links 46 and an arm 48 to the base plate 22 of the cradle, and numeral 50 a hand crank extended from one end of the shaft.

Vertically disposed legs 52 and 54 of the angle bars 12 and 14, respectively, are provided with clip angles 56 that are secured to the legs with bolts 58, or by welding or the like, and the clip angles are adapted to support the machine on a table. The stay bolts 18 and 20, which retain the side bars in spaced relation, are provided with spacing sleeves or tubes 60, and the ends of the bolts are provided with nuts 62.

The rear ends of the side bars 12 and 14 are provided with depending bearing plates 64 and 66 in which the shaft 44 is rotatably mounted, and, as shown in Figure 2, the ends of the shaft are provided with washers 68 and cotter pins 70 which retain the shaft in position laterally.

The arm 48, shown in broken lines in Figure 1, is secured to the intermediate part of the shaft 44, such as by welding, and the links 46 are pivotally connected to the arm by a pin 72. The upper ends of the links are connected by a bolt 74 to a bracket 76, a flange 78 of which is secured to the base plate 22 of the cradle by welding or the like. The lever 48 is provided with pins 80 that are positioned to be engaged by the links 46 to limit the travel of the cradle.

The L-shaped support 26 is secured in position on the side bar 12 with bolts 82 and similar bolts 84 secure the support 28 to the side bar 14. The supports 26 and 28 are provided with vertically disposed slots 86 into which the ends of a rod 88 extend, as shown in Figure 2, and the rod is rotatably mounted in a bearing tube or sleeve 90 that is secured to the lower surface of the base plate 22 of the cradle by welding or the like. By this means the head end of the cradle will be caused to follow a straight or vertical path in its upward and downward movements.

The forward end of the cradle is provided with a lower cutting blade 42, which is formed with a sharp cutting edge 92, and the lower edge of the blade is reinforced by a flange 94 that is secured, such as by welding, to the base plate 22 of the cradle. The upper cutting blade 40, which is provided with a beveled cutting edge 96, is provided with vertically disposed parallel slots 98 and 100, and bolts 102, which are mounted in the posts 30 and 32 extend through the slots for adjustably mounting the blade on the machine. The upper edge of the blade is provided with a flange 104 that is positioned to be engaged by vertically disposed set screws 106 and 108, and the set screws, which are threaded in a flange 110 of the angle bar 34 are locked in adjusted positions with nuts 112. The arms 36 and 38 of the angle bar 34 are provided with bolts 114 that are positioned to extend through rows of spaced openings 116 in the posts 30 and 32. By this means a combination of adjustments is provided whereby the upper blade is adapted to be positioned for the most efficient operation of the device.

The bolt 24 upon which the base plate 22 of the cradle rests is provided with a head 118 at one end and a nut 120 is threaded on the opposite end, and the forward ends of the side bars of the base frame are retained in position with the angle bar 16 which is secured to the side bars with bolts 124 and 126.

With the parts assembled in this manner quarry stones, square or rectangular-shaped in cross section are placed on the base plate 22 of the cradle, which is provided with side walls 128 and 130, and by actuating the crank 50 the portion of the stone projecting beyond the forward end of the cradle is struck by instantaneous blows by the upper and lower blades whereby a smooth square end is cut, and with the end cut in this manner the end surface is square with the sides of the stone.

It will also be understood that the stone may be turned around and held by hand with the end to be cut extended between the cutting blades as the blades are actuated by the crank.

This machine makes it possible to evenly face the ends of quarry stones by mechanical means, thereby obviating the necessity of chiseling the stones by hand.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains, when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now fully described the invention that which is claimed to be new and desired to be procured by Letters Patent, is:

1. A cutter for stones and the like material comprising a base frame, a tray member overlying the base frame and adapted to support a stone or the like to be cut and having a first and a second end, a fulcrum means carried by the base frame and supporting the tray member, adjacent its first end, for curvilinear movement in a vertical path, means locating the tray member on the frame for such curvilinear movement, operating means carried by the frame, means connecting the operating means to the tray member adjacent its second end and adapted to move the tray member about the fulcrum means to raise the first end while lowering the second end, a first cutting blade vertically carried by the first end of the tray member and a second cutting blade vertically aligned and spaced upwardly from the first cutting blade and cooperatively arranged therewith to cut off the portion of the stone or the like projecting outwardly from the first end of the tray member.

2. A cutter for stones and the like material comprising a base frame, a tray member overlying the base frame and adapted to support a stone or the like to be cut and having a first and a second end, a fulcrum means carried by the base frame and supporting the tray member, adjacent its first end, for curvilinear movement in a vertical path, means locating the tray member on the frame for such curvilinear movement, operating means carried by the frame, means connecting the operating means to the tray member adjacent its second end and adapted to move the tray member about the fulcrum means to raise the first end while lowering the second end, a first cutting blade vertically carried by the first end of the tray member and a second cutting blade vertically aligned and spaced upwardly from the first cutting blade and cooperatively arranged therewith to cut off the portion of the stone or the like projecting outwardly from the first end of the tray member, and supporting means upstanding from the base frame and supporting said second cutting blade and means adjustably securing said second cutting blade to its supporting means so that the second cutting blade is adjustable vertically relative to the first cutting blade.

3. A cutter for stones and the like material comprising a base frame having a transversely disposed fulcrum means adjacent one end, a tray member overlying the base frame and adapted to cradle a stone or the like object to be cut, said tray member having a first and a second end, means attaching the tray member to the base frame so that the tray member is fulcrumed, adjacent its first end, on the fulcrum means and is tiltable vertically about said fulcrum means, an operating rod transversely journaled in the base frame adjacent the second end of the tray member, means rotating the operating rod, linkage means connected between the rod and the tray member adjacent the second end thereof and normally holding said second end uppermost and responsive to the operating rod, adapted to lower the second end and raise the first end, a vertically positioned lower cutter blade carried by the first end of the tray member and a vertically adjustable upper cutter blade disposed above and in alignment with the first cutter blade.

References Cited in the file of this patent

UNITED STATES PATENTS

| | | |
|---|---|---|
| 749,937 | Lanigan | Jan. 19, 1904 |
| 1,036,359 | Slentz | Aug. 20, 1912 |
| 2,053,043 | Patterson | Sept. 1, 1936 |
| 2,582,694 | Gundlach | Jan. 15, 1952 |
| 2,613,661 | Huber | Oct. 14, 1952 |
| 2,657,681 | Gatzke | Nov. 3, 1953 |